United States Patent
Dehghan et al.

(10) Patent No.: US 12,218,731 B1
(45) Date of Patent: Feb. 4, 2025

(54) CROSS-LAYER INTELLIGENT BEAM MANAGEMENT ENGINE

(71) Applicant: Dell Products L.P., Round Rock, TX (US)

(72) Inventors: Hoda Dehghan, Kanata (CA); Gwenael Poitau, Montreal (CA)

(73) Assignee: DELL PRODUCTS L.P., Round Rock, TX (US)

( * ) Notice: Subject to any disclaimer, the term of this patent is extended or adjusted under 35 U.S.C. 154(b) by 43 days.

(21) Appl. No.: 18/350,848

(22) Filed: Jul. 12, 2023

(51) Int. Cl.
*H04B 7/06* (2006.01)
*H04B 7/0456* (2017.01)
*H04W 24/10* (2009.01)

(52) U.S. Cl.
CPC ....... *H04B 7/06952* (2023.05); *H04B 7/0456* (2013.01); *H04W 24/10* (2013.01)

(58) Field of Classification Search
CPC .. H04B 7/06952; H04B 7/0456; H04W 24/01
See application file for complete search history.

(56) References Cited

U.S. PATENT DOCUMENTS

| | | | |
|---|---|---|---|
| 2019/0053072 A1* | 2/2019 | Kundargi | H04W 16/28 |
| 2020/0358514 A1 | 11/2020 | Landis et al. | |
| 2022/0399934 A1* | 12/2022 | Bai | H04B 7/155 |
| 2023/0025445 A1* | 1/2023 | Agarwal | H04B 17/318 |
| 2024/0088975 A1* | 3/2024 | Vieira | H04B 7/0617 |
| 2024/0314613 A1* | 9/2024 | Sun | G06N 20/00 |

OTHER PUBLICATIONS

Invitation to Pay Additional Fees for PCT Application No. PCT/US2023/036208 mailed Mar. 28, 2024, 13 pages.
Huawei et al: "Evaluation on AI/ML for beam management" RI-2205892, RAN WGI, Aug. 2022, [https://ftp.3gpp.org/tsg_ran/WG1_RL1/T SGRI_110/Docs/RI-2205892.zip RI-2205892.docx] 22 pages.
International Search Report and Written Opinion for PCT Application No. PCT/US2023/036208 mailed Jul. 3, 2024, 24 pages.

(Continued)

*Primary Examiner* — Jean B Corrielus
(74) *Attorney, Agent, or Firm* — Amin, Turocy & Watson, LLP

(57) ABSTRACT

The technology described herein is directed towards a distributed cross-layer intelligent beam management engine that performs a beam alignment procedure, including learning a site-specific probing codebook and using probing codebook measurements to predict an optimal narrow beam using an AI/ML method. The learned codebook determines site-specific probing beams that can capture particular characteristics of the propagation environment. The distributed engine includes distributed applications with different delay requirements that perform different parts of the beam alignment procedure. One application (e.g., in a non-real time controller) provides probing codebook policy data and reporting policy data, and another application (e.g., in a near-real time controller) learns the probing codebook based on the policy data. A third, real time application performs the beam sweeping based on the probing codebook, with the optimal beam for a user equipment identified by the user equipment.

20 Claims, 12 Drawing Sheets

(56) References Cited

OTHER PUBLICATIONS

Myeung Suk Oh et al: "A Decentralized Pilot Assignment Methodology for Scalable O-RAN Cell-Free Massive MIMO" arxiv.org, arXiv:2301.04774v1 [eess.SP], Cornell University Library, Jan. 2023, 30 pages.
Dahlman, et al., "5G NR: The Next Generation Wireless Access Technology", Copyright © 2018 Elsevier Ltd., ISBN: 978-0-12-814323-0.
3GPP, "Study on New Radio (NR) Access Technology Physical Layer Aspects," 3GPP TR 38.802, (Release 15), V0.0.1, Jun. 9, 2016.
O-RAN Alliance, "O-RAN.WG1.O-RAN-Architecture-Description-v07.00", Oct. 2022.

\* cited by examiner

CROSS-LAYER INTELLIGENT BEAM MANAGEMENT ENGINE

BACKGROUND

To facilitate accurate beam alignment between user equipment and a serving base station in a new radio (NR) network, the third generation partnership project (3GPP) standards provide reasonable flexibility with respect to configurations needed for beam measurement, beam report and beam indication. These configurations have some signaling overhead, resulting in a tradeoff between network performance and how much signaling overhead is implemented. For example, to guarantee continuous connection between user equipment and a base station, frequent beam measurement and measurement reporting are needed, particularly in high mobility scenarios. Such frequent beam measurement and measurement reporting results in increased signaling overhead, which tends to decrease the network's overall performance.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
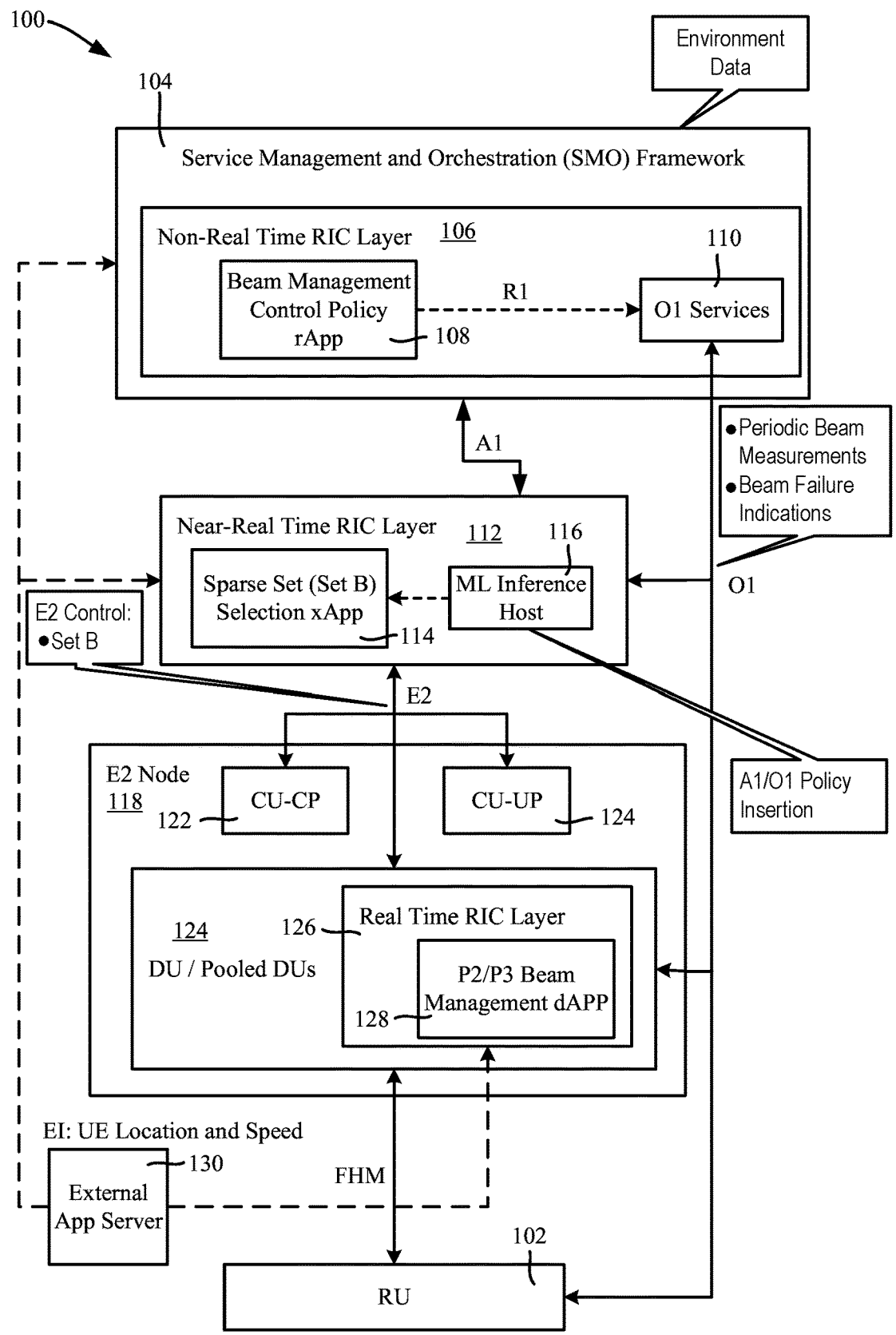
FIG. 1 is an example block diagram representation of a system/architecture that incorporates a distributed cross-layer beam management engine, in accordance with various aspects and implementations of the subject disclosure.

Various aspects of the technology described herein are generally directed towards intelligent beam management that improves overall network performance with respect to throughput and reliability. In one implementation, intelligent beam management is based on a distributed cross-layer beam management engine. The distributed cross-layer beam management engine can be based on the Open-Radio Access Network (O-RAN) architecture, including by having beam management procedures distributed as applications in the radio access network (RAN) control framework.

In one particular implementation, the procedures are implemented as artificial intelligence/machine learning (AI/ML) applications that are run within distributed controllers, including in the non-real time RAN intelligent controller (RIC) layer, the near-real time RAN intelligent controller layer, and a real time intelligent controller layer. The distribution of the beam management applications/procedures is generally based on the latency budget and functionality of each procedure, in a cross-layer intelligent beam management engine framework that includes the data/control exchange between the distributed controllers.

In this framework, a beam alignment procedure learns a site-specific probing codebook, and uses resultant measurements corresponding to the probing codebook to predict an optimal narrow beam. The learned codebook identifies site-specific probing beams that can capture particular characteristics of the propagation environment. To this end, one application (an rApp, or RAN App that can be a microservice/function) in the non-real time RIC provides a probing codebook policy and reporting policy, e.g., based on a trained model. Another application (an xApp, or extended App) runs on the near-real time RIC and learns the probing codebook based on the probing codebook policy data. Based on the learned probing codebook, another application (a dApp, or distributed App) runs on the real time RIC (e.g., a distributed unit) and performs beam sweeping that is compatible with the beam sweeping-based beam alignment framework in new radio (NR, including 5G and beyond).

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations. Furthermore, the particular features, structures, or characteristics may be combined in any suitable manner in one or more embodiments/implementations. It also should be noted that terms used herein, such as "optimize," "optimization," "optimal" and the like only represent objectives to move towards a more optimal state, rather than necessarily obtaining ideal results. For example, "optimal" can mean the highest performing entity of what is available (e.g., the top-rated beam of some limited set of available beams), rather than necessarily achieving a fully optimal result. Similarly, "maximize" means moving towards a maximal state (e.g., up to some threshold limit, if any), rather than necessarily achieving such a state.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

FIG. 1 shows an example system/architecture of a distributed cross-layer beam management engine 100 coupled to a radio unit (RU) 102. In the distributed engine 100, different distributed applications play significant roles in reducing the signaling overhead related to beam management, as well as improving overall accuracy and performance, as described herein. Note that the distributed engine 100 as described herein operates in contrast to legacy RAN systems (in which beam management is centralized at a distributed unit and works based on an exhaustive/predetermined beam set sweep).

In the example system/architecture, a service management and orchestration framework 104 includes a non-real time RIC layer 106 configured to run cloud-based applications (referred to as rApps in O-RAN), including a beam management policy control rApp 108 as described herein. The beam management policy control rApp 108 learns policies via a model (e.g., an ML model as described herein) to help configure a beam measurement set, beam reporting type and period, and beam dwelling time or prediction interval. These policy data can be learned for different types of beam management (i.e., spatial, temporal or both), and the model can be updated based on the input parameters and/or as the environment changes. The beam management policy control rApp 108 is coupled to O1 services 110 via an R1 interface; in turn the O1 services 110 are coupled via the O1 interface to the other distributed engine's layers to communicate various data, including beam set policy data as described herein.

A near-real time RIC layer 112 is coupled via the A1 interface to the non-real time RIC layer 106. The near-real time RIC layer 112 is configured to run edge-based applications, (e.g., xApps (extended apps) in O-RAN, including a sparse beam set (Set B) selection xApp 114 as described herein based on the beam set policy data from the beam management policy control rApp 108. In one alternative, an ML inference host 116 is coupled to or incorporated into the sparse beam set selection xApp 114 to determine, based on the beam set policy data, which sparse subgroup of beams to select from a full available set to perform beam sweeping. Other alternatives (e.g., a lookup table) instead of or in addition to the ML inference host 116 can be used for sparse set selection.

More particularly, the sparse beam set selection xApp 114 is used to determine/define the measurement set using enrichment information, e.g., user equipment (UE) trajectory (location and speed) data. In the sparse beam set selection xApp 114, spatial/temporal correlations are incorporated into the intelligent model (the ML inference host 116) to predict the best measurement set B in advance, based on previous (historical) measurements and corresponding indication sequences. In a straightforward case, the xApp 114 can be simplified into a lookup table, which can be merged with a real time RIC's local edge application, referred to as a dApp (distributed app), e.g., running in a distributed unit. The dApp determines a serving beam or best K-beams as described herein in further detail.

As shown in FIG. 1, in general an E2 node 118, coupled to the near real time RIC layer via the E2 interface, includes a centralized unit (control plane) CU-CP 120 and centralized unit (user plane) CU-UP 122 components. The E2 node 118 also includes a distributed unit (or a pool of distributed units) 124, which includes the real time RIC layer 126 of the distributed beam management engine. The real time RIC layer 126 runs the dApp 128, which can perform the P2 and P3 phases/procedures of beam sweeping as generally described herein. As currently defined in 3GPP, P2 is used for beam refinement of the base station transmission beam(s) by performing a narrower beam sweep over a narrower angular sector than in the P1 phase; in this procedure the wide UE Rx beam is fixed. P3 is used for beam refinement of the UE receiving beam by performing a narrower receiving beam sweep at the UE; in P3, the best detected Tx beam is fixed during the UE receive beam sweep.

Also shown in FIG. 1 is an external application server 130. The external application server 130 participates in various data collection, particularly enrichment information (user equipment trajectory data/location data/speed data as described herein with reference to FIGS. 4 and 5.

As seen in FIG. 1, the architecture including the distributed beam management engine 100 of FIG. 1 can be deployed in a straightforward manner, generally because the distributed intelligence-based solutions can be encapsulated into cloud/edge applications (rApp, xApp) using existing RIC platforms (both non-real time and near-real time) and interfaces, along with an E2 service model radio control (E2SM RC) for beam management use cases. The local edge-based application (dApp 128) can substitute the existing refinement procedure (P2/P3) of beam management on the scheduler. The deployment of a dApp on a real time RIC can be standardized with respect to its platform and the corresponding interfaces, e.g., in O-RAN. The beam management dApp 128 deployed on a real time RIC can interface with O-CU (Open centralized unit/O-DU (Open distributed unit), the non-real time and near-real time RIC platforms. Only one instantiation of the beam management dApp may be used for a pooled distributed unit scenario in the case of deployment on a real time RIC platform.

Turning to further details of the beam management control policy rApp 108, in the non-real time layer 106 the application 108 provides case-based probing codebook policy, which can be used to reduce the number of beams in the probing codebook, where the probing codebook is a small set of sparse beams used for beam sweep operations instead of a full set of beams. In other words, the full set of beams has a larger cardinality relative to the lesser cardinality of the probing codebook set of sparse beams. Note that in this example implementation, the rApp application 108 does not select the measurement set B, but rather provides policy data to be used by the xApp 114 to determine the set B intelligently and/or heuristically.

The beam management control policy rApp 108 also provides reporting type and period data based on environment and measurement data, enrichment information (UE location and speed, environment model from digital twin, and the like) and beam statistics feedback. The application 108 can adaptively change the reporting period based on failure statistics and UE profile data. The application 108 also can change the reporting type based on the information needed for a refinement procedure (e.g., channel state information report feedback on the refinement or sweep procedure) to reduce the cardinality of probing codebook and/or improve accuracy.

Further, via the application 108, the dwelling time can be estimated, which can result in the removal of the conventional first beam sweep procedure (P1) and the reduction of beam failure events over the prediction period. Estimation of dwelling time can also result in an increased average prediction period for different scenarios with different mobility patterns and environment change rates. In addition to the above-described advantages of estimating the dwelling time, doing so helps saving energy on the UE side, because the beam sweep procedure is not needed over the prediction period.

Figure 2:
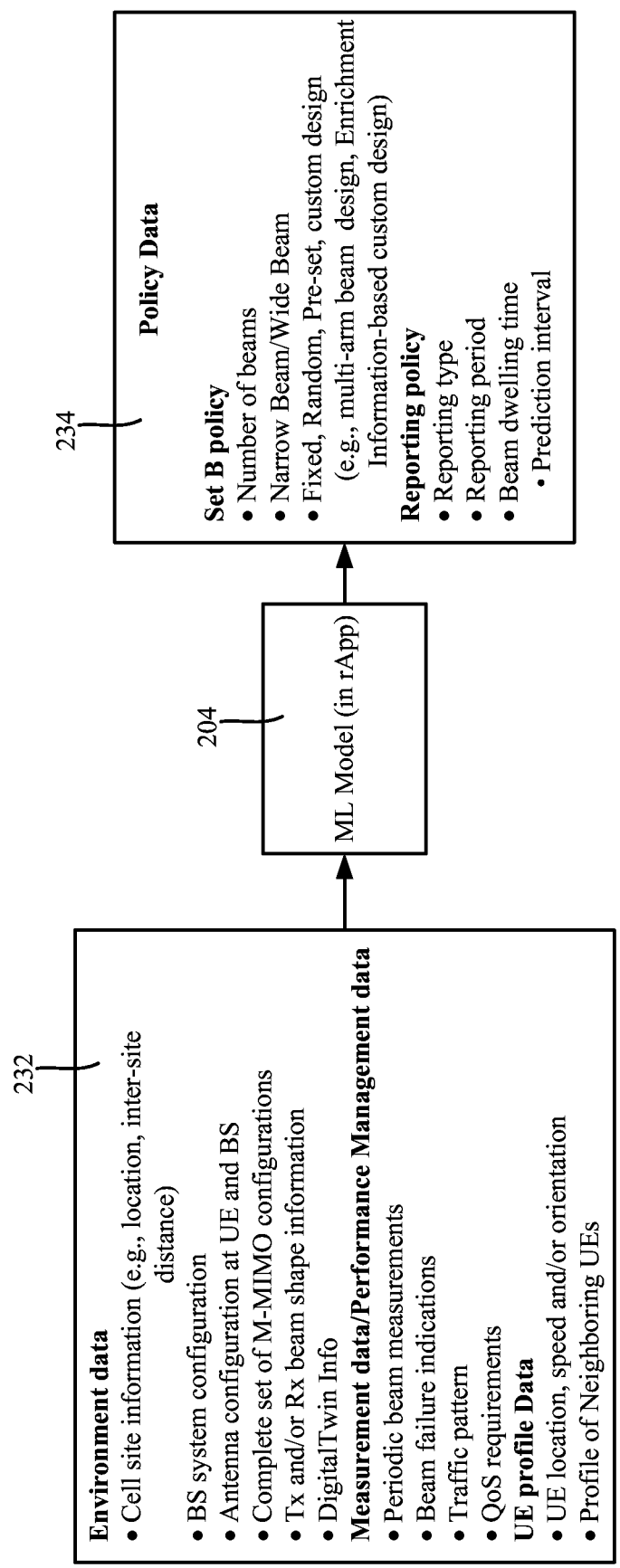
FIG. 2 shows an example machine learning model structure for beam management policy control with respect to an application (e.g., rApp) at a non-real time radio access network (RAN) intelligent controller (RIC) layer of the distributed beam management engine, in accordance with various aspects and implementations of the subject disclosure.

FIG. 2 shows an example of modeling the beam management policy control rApp's AI/ML model 204 based on a set of input parameters 232, along with an output data policy structure 234. In this example, the (non-limiting) input parameters 232 can include environment data, including, but not limited to cell site information (e.g., location, inter-site distance), base station (BS) system configuration data, antenna configuration data at the UE and BS, a complete set of M-MIMO (massive multiple-input, multiple-out) configurations, and digital twin information. Also input is measurement data/performance management data including, but not limited to periodic beam measurement data, beam failure indication data, traffic pattern data, and quality of service (QOS) requirement data. UE profile data is another input parameter group, including, but not limited to UE location data, speed data and orientation data upon availability. Profile data of neighboring UEs can also be input to the model.

The example, non-limiting output policy data 234 can include the probing codebook policy data, such as, but not limited to, the number of beams, information on narrow and/or wide beams, fixed beam data, random beam data and custom design (e.g., multi-arm beam design, specific neural network-based design). Reporting policy is also output, including reporting period, reporting type, and beam dwelling time, with corresponding prediction interval data.

The beam management probing codebook learning/selection xApp 114 (FIG. 1) in the near-real time layer 112 obtains the output policy data 234. The xApp 114 defines the probing codebook by incorporating enrichment information (e.g., channel vector, UE locations and speed upon availability) and the candidate recommendation data provided by the beam management policy control rApp 108 (e.g., number of beams, narrow or wide beams, fixed, random and/or custom design). The application 114 sends the probing codebook candidate to the real time beam predictor dApp 128 over the E2 interface.

The probing codebook candidate can be selected using AI/ML methods (e.g., a neural network architecture such as the model 116). Alternatively other solutions (e.g., a lookup table) can select the probing codebook using the candidate recommendation(s) provided by the beam management policy control.

Figure 3:
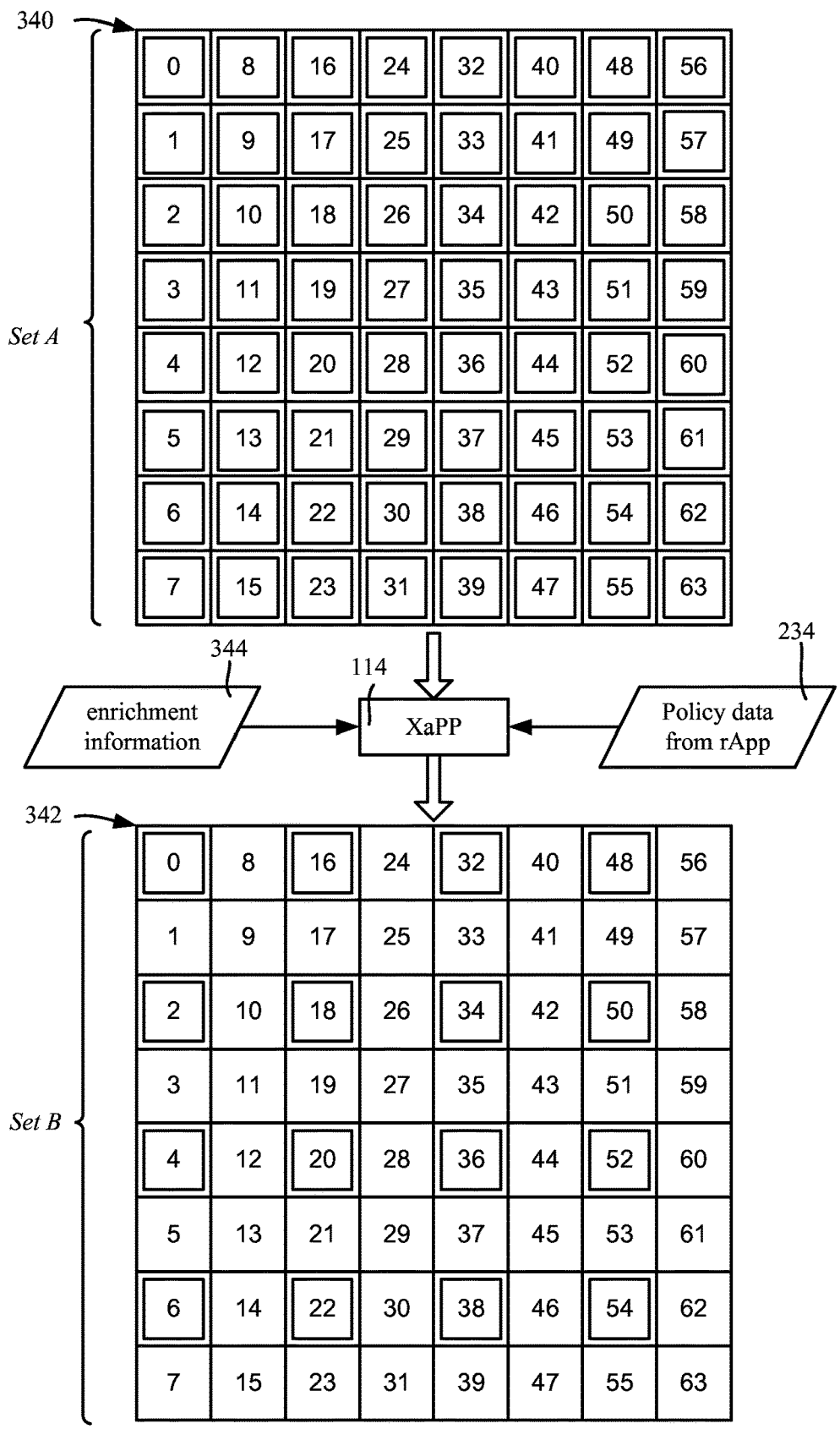
FIG. 3 is an example representation of determining/selecting a sparse beam pattern set (set B) from a full potential beam set (set A) via an application (e.g., xApp) at a near-real time RIC layer of the distributed beam management engine, in accordance with various aspects and implementations of the subject disclosure.

As described herein the rApp 108 defines the policy data 234 for beam measurement set B selection, reporting type and time granularity of measurement and control update. In the example of FIG. 3, the set of all potential beams is called set A (labeled 340) and the smaller (reduced cardinality) set of sparse beams used to do initial beam sweep, instead of full beam sweep over set A, is called set B. The set A is a K×K discrete Fourier transform (DFT) codebook, where K denotes the number of gNB antenna elements. One design example of the measurement set B pattern for K=8 is shown in FIG. 3, where the set B 342 is a subset of the full 64 beam set A 340 (beams 0-63). Note that in FIG. 3 the double squares surrounding a beam number highlights which beams are to be used for sweeping; in the subgroup B example, only 16 (beams 0, 2, 4 . . . 54) of the 64 potential beams are used.

As shown in FIG. 1, the rApp 108 sends the measurement and reporting policy to both the beam management xApp 114 and the beam management P2/P3 dApp 128 over the O1 interface. The xApp 114 determines the beam measurement set B incorporating enrichment information (EI) 344. Once the set B is determined, the xApp 114 application 114 sends the set B candidate to the dApp 128 over the E2 interface, with inference on the dApp 128 (e.g., the O-DU scheduler). The dApp 128 determines the serving beam or K most probable beams per UE, incorporating EI (enrichment information e.g., UE location, speed, and channel state information (CSI) feedback). As shown in FIG. 1, the dApp 128 is deployed on the real time RIC (layer) 126, with the inference coupled to or incorporated into the DU scheduler, or as an AI/ML module deployed on the DU 124.

Figure 4:
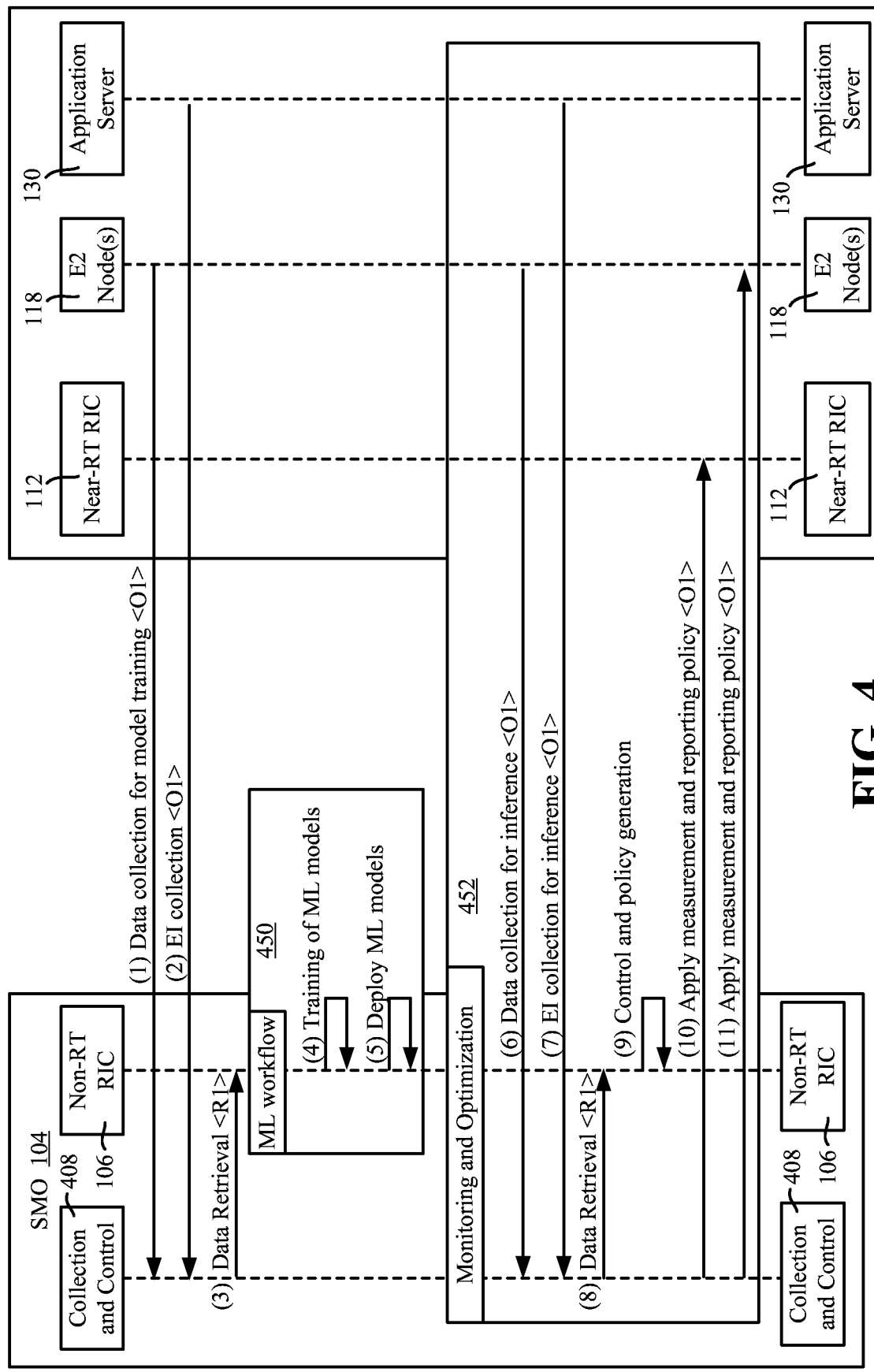
FIG. 4 is an example sequence and dataflow diagram for the beam management policy control application (e.g., rApp) running at the non-real time RIC layer, in accordance with various aspects and implementations of the subject disclosure.

FIG. 4 shows an example dataflow/sequence/call flow diagram for the beam management policy control rApp 108 (FIG. 1). As can be seen in FIG. 4, at arrow one (1) a collection and control component 408 of the SMO 104 is coupled to (or incorporated into) the non-real time (RT) RIC 106, and collects the environment data, UE measurement data, network key performance indicator (KPI) data and UE profile data. Retrieval of collected data and enrichment information (arow three (3)) can be done over the R1 interface from O1 services 110 (FIG. 1) and/or from the application server 130. ML model(s) training and deployment are represented via arrows four (4) and five (5) in the ML workflow block 450, respectively.

Once trained, as shown in the monitoring and optimization block 452 of FIG. 4, inference is performed on current data, obtained via arrow six (6) from the E2 node(s) 118 and via arrow seven (7) from the application server 130. The rApp 108 retrieves (arrow eight (8)) and uses the measurements to configure the set B selection policy data and reporting policy data (including reporting type, reporting period, and beam dwelling time estimation) to generate a set of recommendations to the beam management xApp 114 and/or dApp 128. Predicting the beam dwelling time enables the network to trigger a beam report at a desirable time. Thus, predicting the beam dwelling can reduce the overhead for beam measurement reference signal and beam reporting, and can also reduce the UE power consumption. The set B policy data includes number of beams, type of beams (narrow and/or wide), and set type (fixed, random, pre-set, and custom design). The recommended configuration is provided to the near real-time RIC 112 (the xApp) and/or the E2 node(s) (dApp) via the O1 interface, as represented by the arrows ten (10) and eleven (11).

Figure 5:
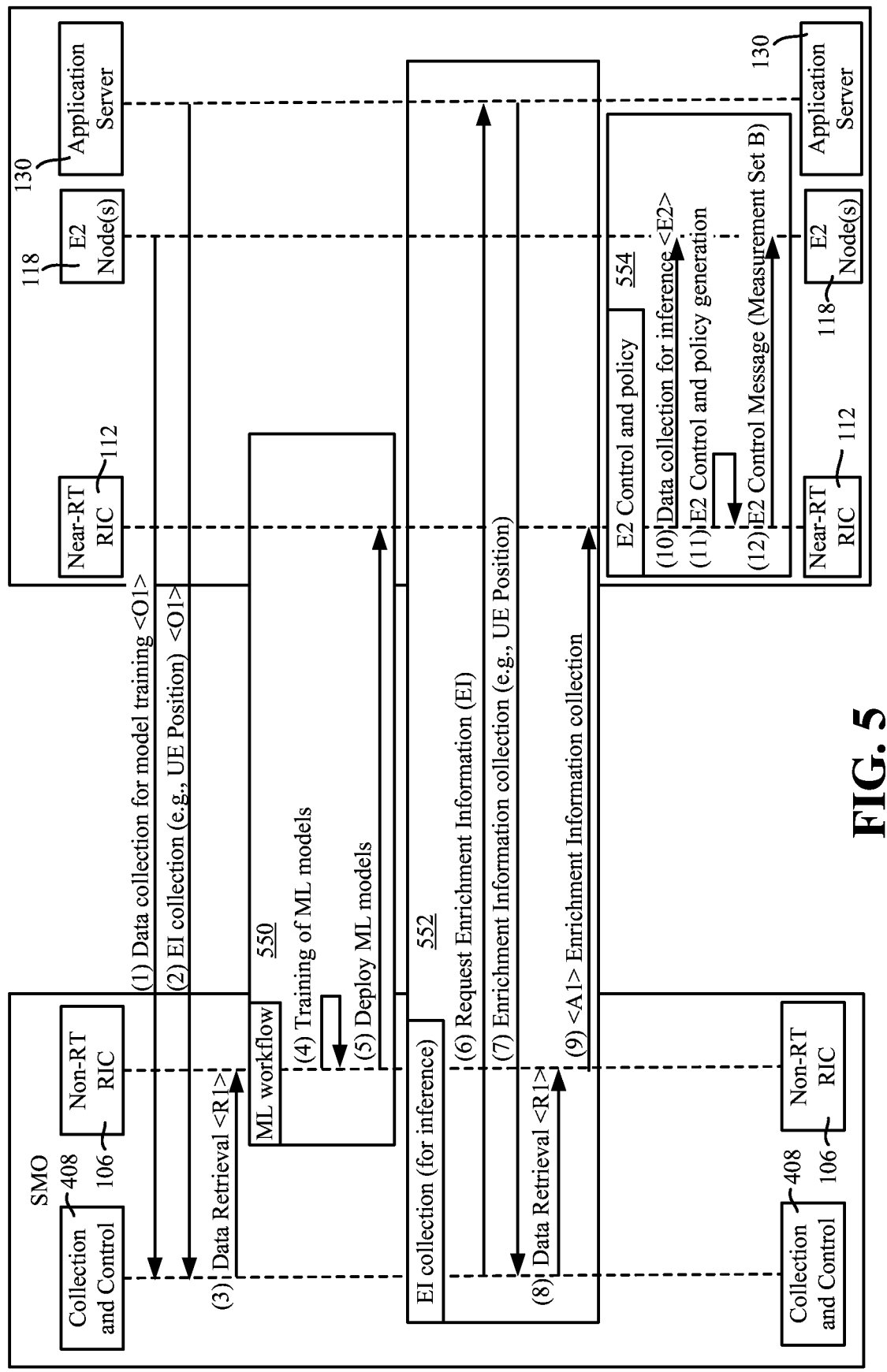
FIG. 5 is an example sequence and dataflow diagram for the beam management measurement set selection application (e.g., xApp) running at the near-real time RIC layer, in accordance with various aspects and implementations of the subject disclosure.

FIG. 5 shows an example dataflow/sequence/call flow diagram for the beam management set selection xApp 114 (FIG. 1). In general and as described herein, the xApp application 114 determines the beam measurement set B based on collected enrichment information (e.g., UE location and speed) and the recommendation policy data provided by the beam management policy control rApp 108. The xApp 114 sends the set B candidate to the dApp over the E2 interface with the inference by the dApp (i.e., O-DU scheduler).

As can be seen in FIG. 5, at arrow one (1) the collection and control component 408 of the SMO 104 is coupled to (or incorporated into) the non-real time (RT) RIC 104, and collects the model training data from the E2 node(s) 118. At arrow two (2), enrichment information is collected from the application server 130. Retrieval of collected data and enrichment information (arow three (3)) can be done over the R1 interface from O1 services 110 (FIG. 1) and/or from the application server 130. In this example, ML model(s) training and deployment are represented via arrows four (4) and five (5) in the ML workflow block 550, respectively; note that this is only one example implementation, and alternative solutions such as a lookup table can be used.

In this example, once trained, as shown in the monitoring and optimization block 452 of FIG. 4, enrichment information is collected for inference (block 552), obtained via a request represented by arrow six (6) to the application server 130, and a response from the application server 130 represented by via arrow seven (7). The rApp 108 in the non-real time RIC 106 retrieves (arrow eight (8)) the enrichment information, which is then sent to/collected by the xApp 114 (arrow nine (9)) in the near-real time RIC 112. Data collection for inference is sent from the near-real time RIC 112 to the E2 node(s) 118 (arrow ten (10)).

The xApp 114 uses the collected measurement data to estimate the best probing beam measurement set B in different scenarios, as generally represented by arrow eleven (11). The determined measurement set B is provided to the E2 node(s) 118, that is, to the P2/P3 dApp 128 via the E2 interface (arrow twelve (12)).

Figure 6:
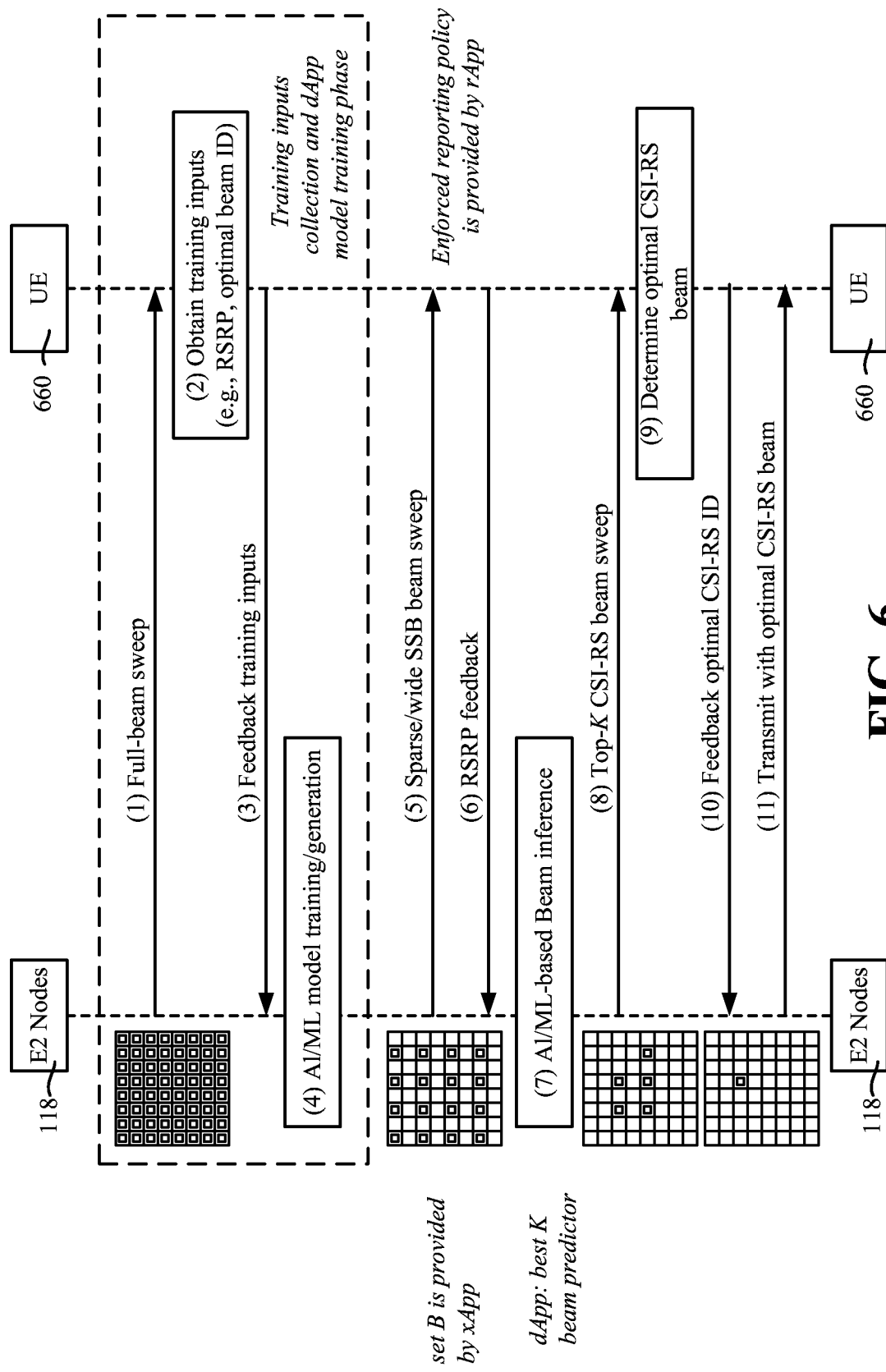
FIG. 6 is an example sequence and dataflow diagram representing spatial domain beam management operations to determine an optimal communication beam between a node and a user equipment, in accordance with various aspects and implementations of the subject disclosure.

FIG. 6 is an example spatial domain beam management dataflow/sequence diagram of a network-side AI/ML spatial beam management procedure, where both AI/ML dApp model training and inference are performed at the base station. For the training phase, the network sweeps all potential beams (set A) to enable the UE 660 to determine and report the optimal beam ID, as represented by arrow one (1). The reference signal received power data (RSRPs) of a small set of sparse beams (set B) along with the corresponding optimal beam ID obtained from the full set of swept beams are fed back by the UE 660 to facilitate the collection of training input data, as represented by block two (2) and arrow three (3).

These training input data (the RSRPs of a small set of beams and their corresponding optimal beam IDs) from multiple UEs within the coverage area are collected by the network. For model training phase, the reported RSRPs of sparse set B and the optimal beam ID are used for training cell-specific AI/ML models (arrow four (4)).

In the model inference phase, block four (4), the network (E2 node) only needs to sweep beams from the small set of sparse SSB (synchronization signal block) beams (set B) as represented by arrow five (5). Then the UE measures the swept SSB beams and feeds back (arrow six (6)) their corresponding RSRPs to the network. The network inputs the UE measurements to the trained AI/ML model (arrow seven (7)), which outputs the top-K narrow beams (arrow eight (8)); (this subgroup of the top-K narrow beams can be thought of as at least a threshold high performing beam sweep measurement subgroup as determined by the AI/ML-based beam inference of block seven (7), relative to other, lesser performing beams).

As shown via arrow eight (8) and block nine (9) of FIG. 6, the inferred top-K narrow beams are swept via CSI-RS (channel state information-reference signal) sweeping to determine a final optimal narrow beam. The UE returns the optimal beam's channel state information reference signal identifier (ID) as represented by arrow ten (10); (what is optimal can be considered the beam that achieves at least a threshold high performance, e.g., the highest performance relative to other candidate beams from the top-K subgroup). The network then uses this identified optimal beam to transmit data to the UE, as represented by arrow eleven (11).

To summarize, the architecture described herein provides a distributed cross layer beam management engine that distributes beam management phases P1, P2, and P3 based on their latency budget and required granularity on control/insert and report commands. The distributed beam management engine includes three different applications (named as beam management policy control rApp, set selection xApp, and P2/P3 beam management dApp) distributed over the network. Based on the architecture, training, deployment, inference, and performance monitoring of (up to) three different ML models deployed on non-RT RIC (rApp), near-RT RIC (xApp) and RT RIC (dApp), respectively are coordinated. This coordination of different layer applications can include a dependency assessment of rApp, xApp, and dApp and their corresponding effects on the prediction accuracy.

Figure 7:
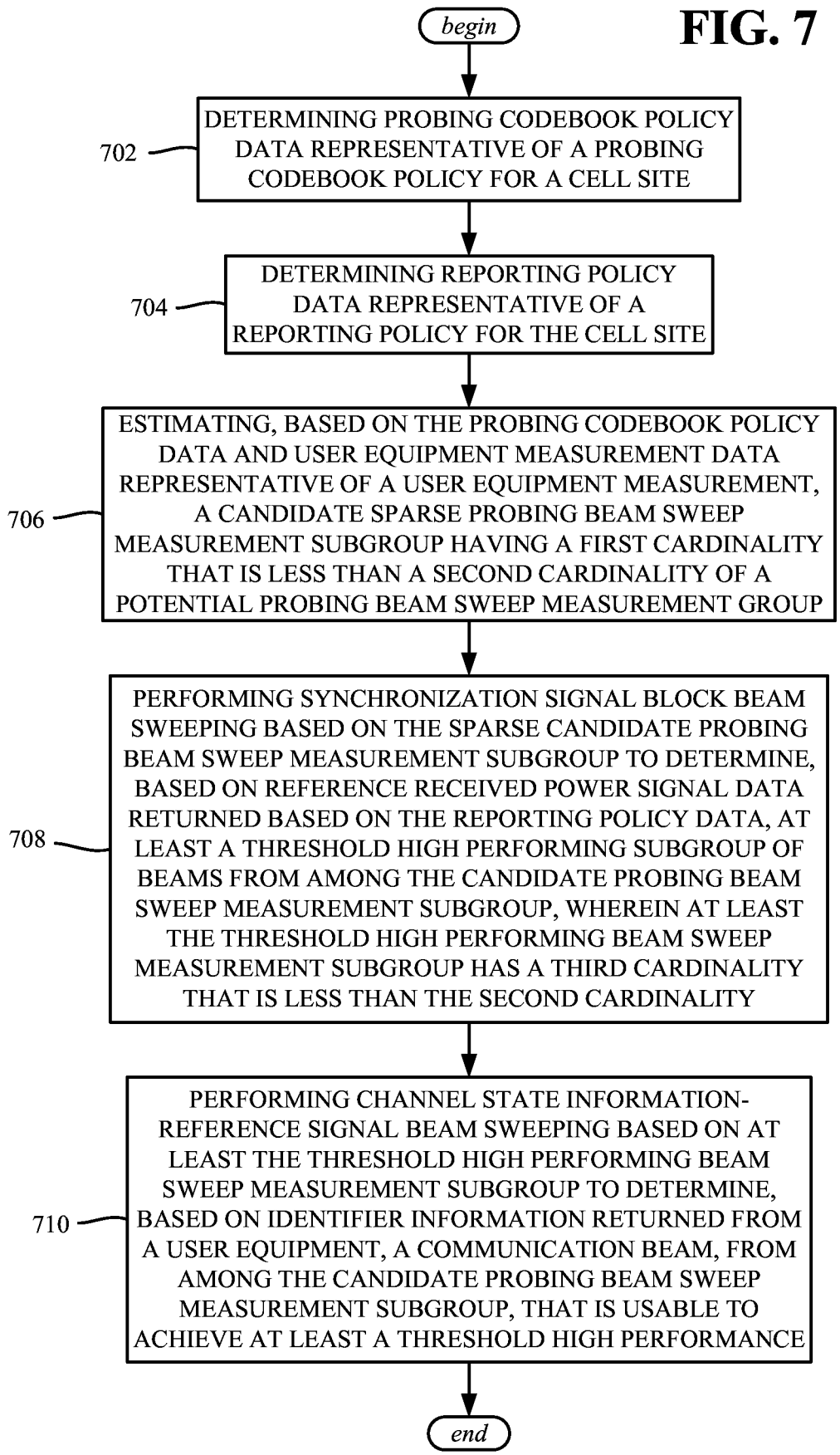
FIG. 7 is a flow diagram showing example operations related to determining an optimal communication beam from among a beam sweep measurement (e.g., top-K beam) subgroup, in accordance with various aspects and implementations of the subject disclosure.

One or more aspects can be embodied in network equipment, such as represented in the example operations of FIG. 7, and for example can include a memory that stores computer executable components and/or operations, and a processor that executes computer executable components and/or operations stored in the memory. Example operations can include operation 702, which represents determining probing codebook policy data representative of a probing codebook policy for a cell site. Example operation 704 represents determining reporting policy data representative of a reporting policy for the cell site. Example operation 706 represents estimating, based on the probing codebook policy data and user equipment measurement data representative of a user equipment measurement, a candidate sparse probing beam sweep measurement subgroup having a first cardinality that is less than a second cardinality of a potential probing beam sweep measurement group. Example operation 708 represents performing synchronization signal block beam sweeping based on the sparse candidate probing beam sweep measurement subgroup to determine, based on reference received power signal data returned based on the reporting policy data, at least a threshold high performing subgroup of beams from among the candidate probing beam sweep measurement subgroup, wherein at least the threshold high performing beam sweep measurement subgroup has a third cardinality that is less than the second cardinality. Example operation 710 represents performing channel state information-reference signal beam sweeping based on at least the threshold high performing beam sweep measurement subgroup to determine, based on identifier information returned from a user equipment, a communication beam, from among the candidate probing beam sweep measurement subgroup, that is usable to achieve at least a threshold high performance.

At least the threshold high performing beam sweep measurement can be a top-performing beam sweep measurement, determination of the communication beam can include determination of an optimal communication beam that is usable to achieve an optimal performance from among the candidate probing beam sweep measurement subgroup, and further operations can include communicating with the user equipment via the optimal communication beam.

Determining the probing codebook policy data and determining the reporting policy data for the cell site can include inputting, to a model, at least one of: environment data representative of a characteristic of an environment associated with the cell site, measurement data representative of a measurement applicable to the cell site, performance management data relating to management of a performance applicable to the cell site, or user equipment profile data representative of a user equipment profile; the model can be trained with at least one of: prior collected environment data representative of past characteristics of the environment associated with the cell site, prior collected measurement data representative of past measurements associated with the cell site, prior collected performance management data relating to past management of the performance applicable to the cell site, or prior collected user equipment profile data representative of past user equipment profiles. The environment data can include at least one of: cell site information, base station system configuration data, based station antenna configuration data, user equipment antenna configuration data, transmit beam shape information, receive beam shape information, or digital twin data. The measurement data can include periodic beam measurement data, and the performance management data can include at least one of: beam failure indication data, traffic pattern data, or quality of service data.

The user equipment profile data can include at least one of: user equipment location data, user equipment speed data, user equipment orientation data, or neighboring user equipment profile data.

The probing codebook policy data can include at least one of: number of beams data, narrow beam data, wide beam data, fixed beam data, random beam data, preset beam data, or beam design data.

The reporting policy data can include at least one of: reporting type data, reporting period data, beam dwelling time data, or prediction interval data.

Determining the probing codebook policy data can be performed by a first layer of a distributed cross layer beam management engine, and further operations can include communicating, from the first layer to a second layer of the distributed cross layer beam management engine, the probing codebook policy data.

The first layer of the distributed cross layer beam management engine can be incorporated into a non-real time radio access network controller, and the second layer of the distributed cross layer beam management engine can be incorporated into a near-real time radio access network controller.

Estimating the candidate sparse probing beam sweep measurement subgroup can be performed by the second layer of the distributed cross layer beam management engine, and further operations can include communicating, from the second layer to a third layer of the distributed cross layer beam management engine, the candidate sparse probing beam sweep measurement subgroup.

Performing the synchronization signal block beam sweeping, and performing the channel state information-reference signal beam sweeping, can be performed by the third layer of the distributed cross layer beam management engine.

The third layer of the distributed cross layer beam management engine can be incorporated into a distributed unit.

Figure 8:
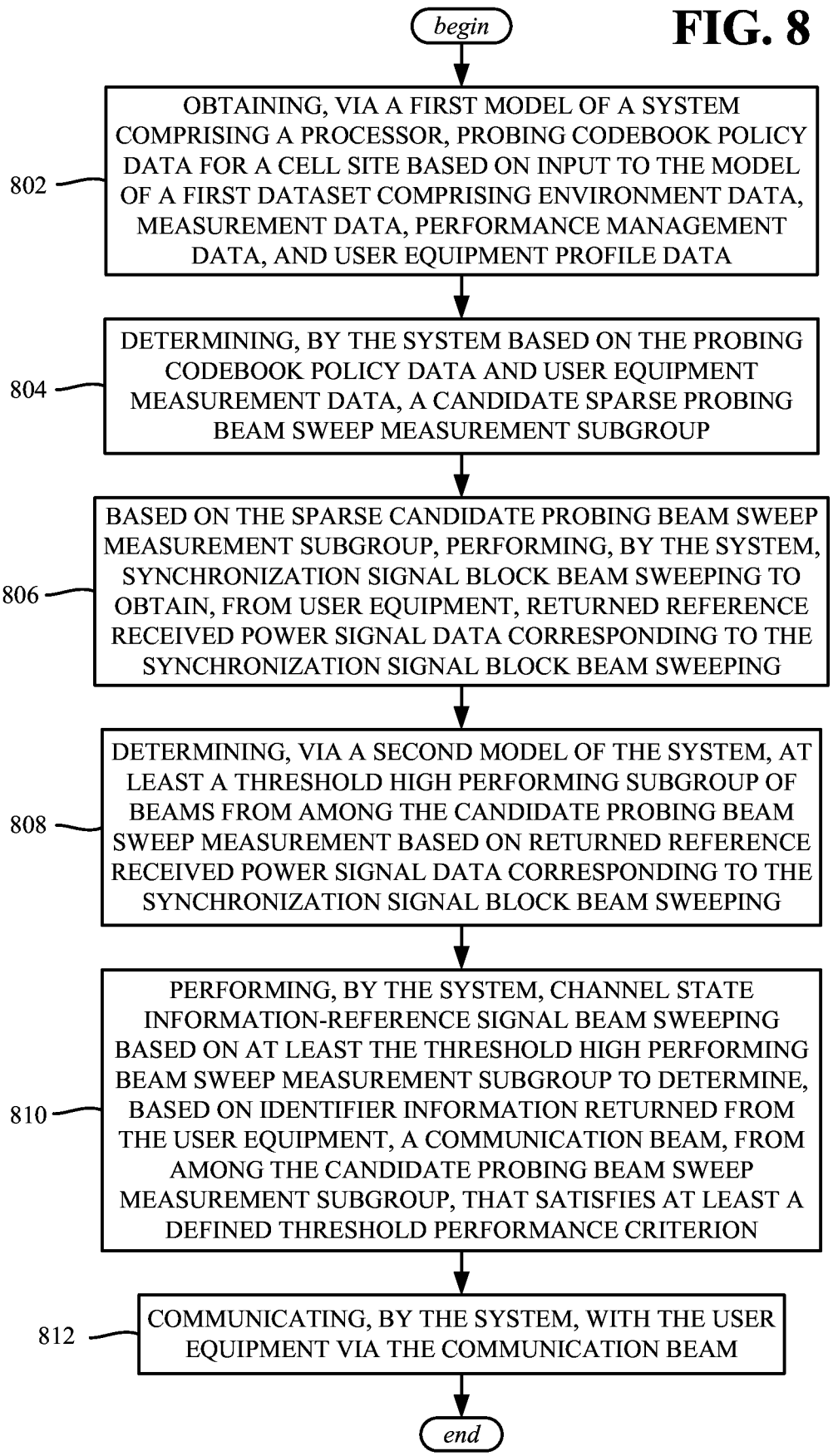
FIG. 8 is a flow diagram showing example operations related to determining an optimal communication beam and using that beam for communicating with a user equipment, in accordance with various aspects and implementations of the subject disclosure.

One or more example aspects, such as corresponding to example operations of a method, are represented in FIG. 8. Example operation 802 represents obtaining, via a first model of a system comprising a processor, probing codebook policy data for a cell site based on input to the model of a first dataset comprising environment data, measurement data, performance management data, and user equipment profile data. Example operation 804 represents determining, by the system based on the probing codebook policy data and user equipment measurement data, a candidate sparse probing beam sweep measurement subgroup. Example operation 806 represents based on the sparse candidate probing beam sweep measurement subgroup, performing, by the system, synchronization signal block beam sweeping to obtain, from user equipment, returned reference received power signal data corresponding to the synchronization signal block beam sweeping. Example operation 808 represents determining, via a second model of the system, at least a threshold high performing subgroup of beams from among the candidate probing beam sweep measurement based on returned reference received power signal data corresponding to the synchronization signal block beam sweeping. Example operation 810 represents performing, by the system, channel state information-reference signal beam sweeping based on at least the threshold high performing beam sweep measurement subgroup to determine, based on identifier information returned from the user equipment, a communication beam, from among the candidate probing beam sweep measurement subgroup, that satisfies at least a defined threshold performance criterion. Example operation 812 represents communicating, by the system, with the user equipment via the communication beam.

Further operations can include obtaining, via the first model of the system, reporting policy data for the cell site.

The first model can be incorporated into a non-real time radio access network intelligent controller, and obtaining the probing codebook policy data can include obtaining the first dataset at the non-real time radio access network intelligent controller, and inputting the first dataset to the first model.

The first model can be coupled to a near-real time radio access network intelligent controller; determining the candidate sparse probing beam sweep measurement subgroup can be performed by an application of the near-real time radio access network intelligent controller, and the near-real time radio access network intelligent controller can be coupled to a distributed unit including the second model; further operations can include communicating the candidate sparse probing beam sweep measurement subgroup from the near-real time radio access network intelligent controller to the distributed unit.

At least the threshold high performing beam sweep measurement can be a top-performing beam sweep measurement, and determination of the communication beam can include determination of an optimal communication beam that is usable to achieve an optimal performance from among the candidate probing beam sweep measurement subgroup.

Figure 9:
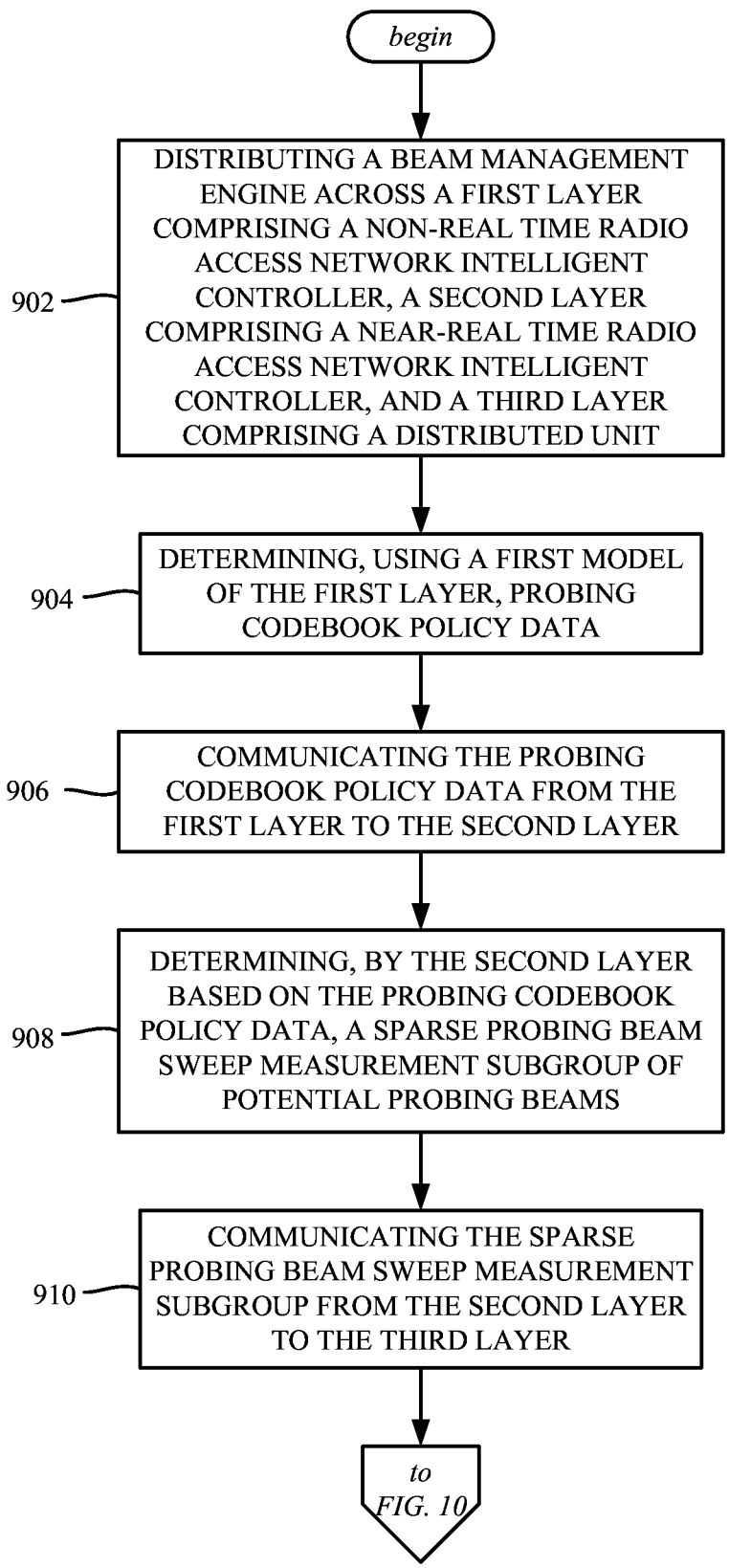
FIGS. 9 and 10 comprise a flow diagram showing example operations related to performing beam sweeping with a top-performing beam sweep measurement subgroup, for determining an optimal communication beam with respect to a user equipment, in accordance with various aspects and implementations of the subject disclosure.
Figure 10:
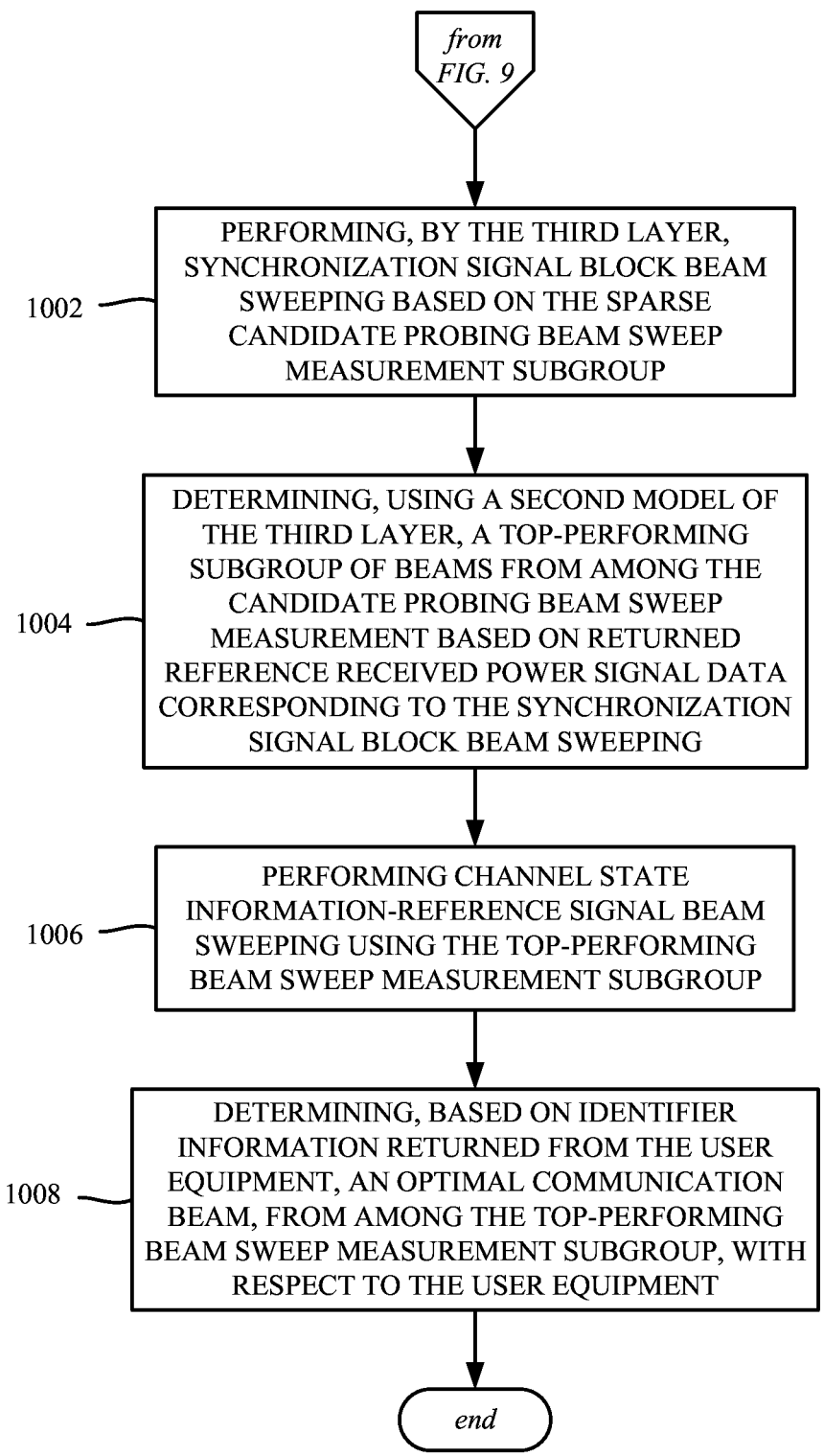

FIGS. 9 and 10 summarize various example operations, e.g., corresponding to a machine-readable medium, comprising executable instructions that, when executed by a processor, facilitate performance of operations. Example operation 902 of FIG. 9 represents distributing a beam management engine across a first layer comprising a non-real time radio access network intelligent controller, a second layer comprising a near-real time radio access network intelligent controller, and a third layer comprising a distributed unit. Example operation 904 represents determining, using a first model of the first layer, probing codebook policy data. Example operation 906 represents communicating the probing codebook policy data from the first layer to the second layer. Example operation 908 represents determining, by the second layer based on the probing codebook policy data, a sparse probing beam sweep measurement subgroup of potential probing beams. Example operation 910 represents communicating the sparse probing beam sweep measurement subgroup from the second layer to the third layer. The operations continue at FIG. 10, in which example operation 1002 represents performing, by the third layer, synchronization signal block beam sweeping based on the sparse candidate probing beam sweep measurement subgroup. Example operation 1004 represents determining, using a second model of the third layer, a top-performing subgroup of beams from among the candidate probing beam sweep measurement based on returned reference received power signal data corresponding to the synchronization signal block beam sweeping. Example operation 1006 represents performing channel state information-reference signal beam sweeping using the top-performing beam sweep measurement subgroup. Example operation 1008 represents determining, based on identifier information returned from the user equipment, an optimal communication beam, from among the top-performing beam sweep measurement subgroup, with respect to the user equipment.

Further operations can include determining, using the first model of the first layer, reporting policy data, and communicating the reporting policy data from the first layer to the second layer and the third layer.

As can be seen, the technology described herein facilitates improved reliability and throughput, along with decreased latency and signaling overhead, in a communications network. A distributed cross layer beam management engine, which can be based on an O-RAN architecture, facilitates distribution of beam management P1, P2, and P3 procedures on a RAN control framework. In O-RAN, this can be accomplished via a beam management policy control rApp, set selection xApp, and P2/P3 beam management dApp) distributed over the network. Enrichment information (e.g., UE location and speed), spatial/temporal dependencies and cross-UE correlations can be incorporated into beam measurement and beam selection processes, which improve the overall performance.

Figure 11:
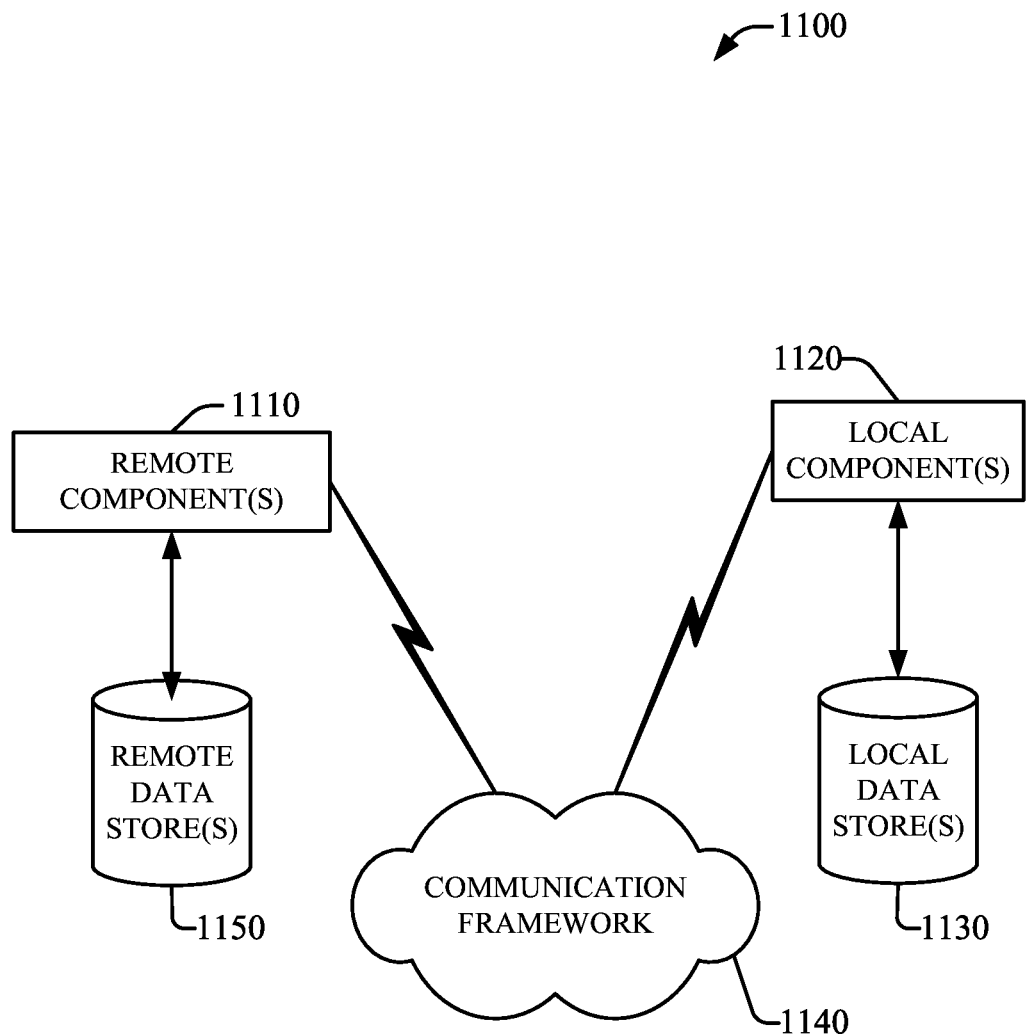
FIG. 11 is a block diagram representing an example computing environment into which aspects of the subject matter described herein may be incorporated.

FIG. 11 is a schematic block diagram of a computing environment 1100 with which the disclosed subject matter can interact. The system 1100 comprises one or more remote component(s) 1110. The remote component(s) 1110 can be hardware and/or software (e.g., threads, processes, computing devices). In some embodiments, remote component(s) 1110 can be a distributed computer system, connected to a local automatic scaling component and/or programs that use the resources of a distributed computer system, via communication framework 1140. Communication framework 1140 can comprise wired network devices, wireless network devices, mobile devices, wearable devices, radio access network devices, gateway devices, femtocell devices, servers, etc.

The system 1100 also comprises one or more local component(s) 1120. The local component(s) 1120 can be hardware and/or software (e.g., threads, processes, computing devices). In some embodiments, local component(s) 1120 can comprise an automatic scaling component and/or programs that communicate/use the remote resources 1110, etc., connected to a remotely located distributed computing system via communication framework 1140.

One possible communication between a remote component(s) 1110 and a local component(s) 1120 can be in the form of a data packet adapted to be transmitted between two or more computer processes. Another possible communication between a remote component(s) 1110 and a local component(s) 1120 can be in the form of circuit-switched data adapted to be transmitted between two or more computer processes in radio time slots. The system 1100 comprises a communication framework 1140 that can be employed to facilitate communications between the remote component(s) 1110 and the local component(s) 1120, and can comprise an air interface, e.g., Uu interface of a UMTS network, via a long-term evolution (LTE) network, etc. Remote component(s) 1110 can be operably connected to one or more remote data store(s) 1150, such as a hard drive, solid state drive, SIM card, device memory, etc., that can be employed to store information on the remote component(s) 1110 side of communication framework 1140. Similarly, local component(s) 1120 can be operably connected to one or more local data store(s) 1130, that can be employed to store information on the local component(s) 1120 side of communication framework 1140.

Figure 12:
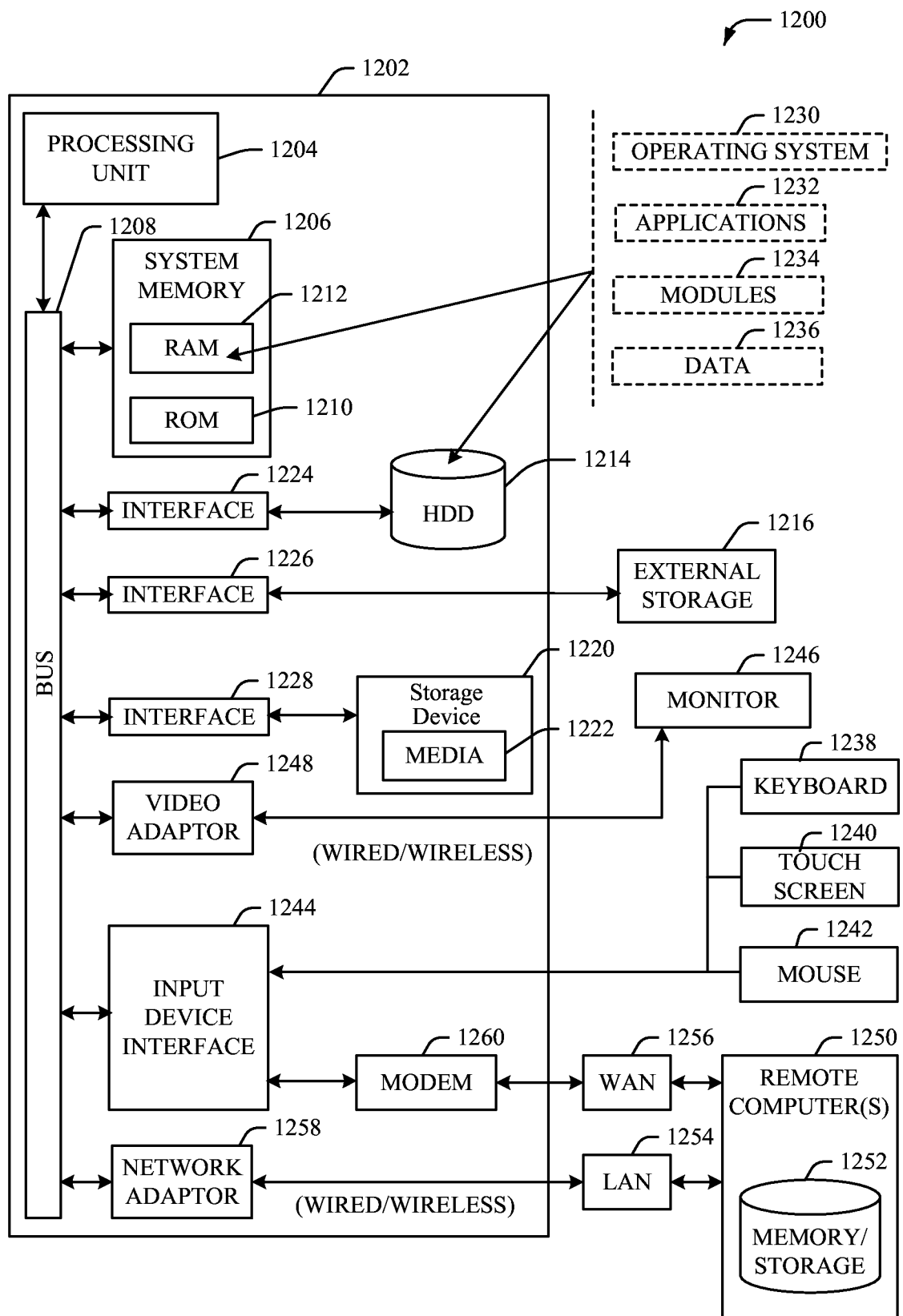
FIG. 12 depicts an example schematic block diagram of a computing environment with which the disclosed subject matter can interact/be implemented at least in part, in accordance with various aspects and implementations of the subject disclosure.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), and can include one or more external storage devices 1216 (e.g., a magnetic floppy disk drive (FDD) 1216, a memory stick or flash drive reader, a memory card reader, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214.

Other internal or external storage can include at least one other storage device 1220 with storage media 1222 (e.g., a solid state storage device, a nonvolatile memory device, and/or an optical disk drive that can read or write from removable media such as a CD-ROM disc, a DVD, a BD, etc.). The external storage 1216 can be facilitated by a network virtual machine. The HDD 1214, external storage device(s) 1216 and storage device (e.g., drive) 1220 can be connected to the system bus 1208 by an HDD interface 1224, an external storage interface 1226 and a drive interface 1228, respectively.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1294 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are examples and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. Network equipment, comprising:
   a processor; and
   a memory that stores executable instructions that, when executed by the processor, facilitate performance of operations, the operations comprising:
   determining probing codebook policy data representative of a probing codebook policy for a cell site;
   determining reporting policy data representative of a reporting policy for the cell site;
   estimating, based on the probing codebook policy data and user equipment measurement data representative of a user equipment measurement, a candidate sparse probing beam sweep measurement subgroup having a first cardinality that is less than a second cardinality of a potential probing beam sweep measurement group;
   performing synchronization signal block beam sweeping based on the sparse candidate probing beam sweep measurement subgroup to determine, based on reference received power signal data returned based on the reporting policy data, at least a threshold high performing subgroup of beams from among the candidate probing beam sweep measurement subgroup, wherein at least the threshold high performing beam sweep measurement subgroup has a third cardinality that is less than the second cardinality; and
   performing channel state information-reference signal beam sweeping based on at least the threshold high performing beam sweep measurement subgroup to determine, based on identifier information returned from a user equipment, a communication beam, from among the candidate probing beam sweep measurement subgroup, that is usable to achieve at least a threshold high performance.

2. The network equipment of claim 1, wherein at least the threshold high performing beam sweep measurement is a top-performing beam sweep measurement, wherein determination of the communication beam comprises determination of an optimal communication beam that is usable to achieve an optimal performance from among the candidate probing beam sweep measurement subgroup, and wherein the operations further comprise communicating with the user equipment via the optimal communication beam.

3. The network equipment of claim 1, wherein the determining of the probing codebook policy data and the determining of the reporting policy data for the cell site comprises inputting, to a model, at least one of: environment data representative of a characteristic of an environment associated with the cell site, measurement data representative of a measurement applicable to the cell site, performance management data relating to management of a performance applicable to the cell site, or user equipment profile data representative of a user equipment profile, and wherein the model was trained with at least one of: prior collected environment data representative of past characteristics of the environment associated with the cell site, prior collected measurement data representative of past measurements associated with the cell site, prior collected performance management data relating to past management of the performance applicable to the cell site, or prior collected user equipment profile data representative of past user equipment profiles.

4. The network equipment of claim 3, wherein the environment data comprises at least one of: cell site information, base station system configuration data, based station antenna configuration data, user equipment antenna configuration data, transmit beam shape information, receive beam shape information, or digital twin data.

5. The network equipment of claim 3, wherein the measurement data comprises periodic beam measurement data, and wherein the performance management data comprises at least one of: beam failure indication data, traffic pattern data, or quality of service data.

6. The network equipment of claim 3, wherein the user equipment profile data comprises at least one of: user equipment location data, user equipment speed data, user equipment orientation data, or neighboring user equipment profile data.

7. The network equipment of claim 3, wherein the probing codebook policy data comprises at least one of: number of beams data, narrow beam data, wide beam data, fixed beam data, random beam data, preset beam data, or beam design data.

8. The network equipment of claim 3, wherein the reporting policy data comprises at least one of: reporting type data, reporting period data, beam dwelling time data, or prediction interval data.

9. The network equipment of claim 1, wherein the determining of the probing codebook policy data is performed by a first layer of a distributed cross layer beam management engine, and wherein the operations further comprise communicating, from the first layer to a second layer of the distributed cross layer beam management engine, the probing codebook policy data.

10. The network equipment of claim 9, wherein the first layer of the distributed cross layer beam management engine is incorporated into a non-real time radio access network controller, and wherein the second layer of the distributed cross layer beam management engine is incorporated into a near-real time radio access network controller.

11. The network equipment of claim 9, wherein the estimating of the candidate sparse probing beam sweep measurement subgroup is performed by the second layer of the distributed cross layer beam management engine, and wherein the operations further comprise communicating, from the second layer to a third layer of the distributed cross layer beam management engine, the candidate sparse probing beam sweep measurement subgroup.

12. The network equipment of claim 11, wherein the performing of the synchronization signal block beam sweeping, and the performing of the channel state information-reference signal beam sweeping, are performed by the third layer of the distributed cross layer beam management engine.

13. The network equipment of claim 11, wherein the third layer of the distributed cross layer beam management engine is incorporated into a distributed unit.

14. A method, comprising:
  obtaining, via a first model of a system comprising a processor, probing codebook policy data for a cell site based on input to the model of a first dataset comprising environment data, measurement data, performance management data, and user equipment profile data;
  determining, by the system based on the probing codebook policy data and user equipment measurement data, a candidate sparse probing beam sweep measurement subgroup;
  based on the sparse candidate probing beam sweep measurement subgroup, performing, by the system, synchronization signal block beam sweeping to obtain, from user equipment, returned reference received power signal data corresponding to the synchronization signal block beam sweeping;
  determining, via a second model of the system, at least a threshold high performing subgroup of beams from among the candidate probing beam sweep measurement subgroup based on returned reference received power signal data corresponding to the synchronization signal block beam sweeping;
  performing, by the system, channel state information-reference signal beam sweeping based on at least the threshold high performing beam sweep measurement subgroup to determine, based on identifier information returned from the user equipment, a communication beam, from among the candidate probing beam sweep measurement subgroup, that satisfies at least a defined threshold performance criterion; and
  communicating, by the system, with the user equipment via the communication beam.

15. The method of claim 14, further comprising obtaining, via the first model of the system, reporting policy data for the cell site.

16. The method of claim 14, wherein the first model is incorporated into a non-real time radio access network intelligent controller, and wherein the obtaining of the probing codebook policy data comprises obtaining the first dataset at the non-real time radio access network intelligent controller, and inputting the first dataset to the first model.

17. The method of claim 16, wherein the first model is coupled to a near-real time radio access network intelligent controller, wherein the determining of the candidate sparse probing beam sweep measurement subgroup is performed by an application of the near-real time radio access network intelligent controller, and wherein the near-real time radio access network intelligent controller is coupled to a distributed unit comprising the second model, and further comprising, communicating the candidate sparse probing beam sweep measurement subgroup from the near-real time radio access network intelligent controller to the distributed unit.

18. The method of claim 17, wherein at least the threshold high performing beam sweep measurement is a top-performing beam sweep measurement, and wherein determination of the communication beam comprises determination of an optimal communication beam that is usable to achieve an optimal performance from among the candidate probing beam sweep measurement subgroup.

19. A non-transitory machine-readable medium, comprising executable instructions that, when executed by a processor, facilitate performance of operations, the operations comprising:
  distributing a beam management engine across a first layer comprising a non-real time radio access network intelligent controller, a second layer comprising a near-real time radio access network intelligent controller, and a third layer comprising a distributed unit;
  determining, using a first model of the first layer, probing codebook policy data;
  communicating the probing codebook policy data from the first layer to the second layer;
  determining, by the second layer based on the probing codebook policy data, a sparse probing beam sweep measurement subgroup of potential probing beams;
  communicating the sparse probing beam sweep measurement subgroup from the second layer to the third layer;
  performing, by the third layer, synchronization signal block beam sweeping based on the sparse candidate probing beam sweep measurement subgroup;
  determining, using a second model of the third layer, a top-performing subgroup of beams from among the candidate probing beam sweep measurement based on returned reference received power signal data corresponding to the synchronization signal block beam sweeping;
  performing channel state information-reference signal beam sweeping using the top-performing beam sweep measurement subgroup; and
  determining, based on identifier information returned from the user equipment, an optimal communication beam, from among the top-performing beam sweep measurement subgroup, with respect to the user equipment.

20. The non-transitory machine-readable medium of claim 19, wherein the operations further comprise determining, using the first model of the first layer, reporting policy data, and communicating the reporting policy data from the first layer to the second layer and the third layer.

\* \* \* \* \*